(12) United States Patent
Fischer

(10) Patent No.: US 8,532,073 B2
(45) Date of Patent: Sep. 10, 2013

(54) DISCONTINUOUS RECEPTION OPERATION DURING CONTINUOUS TRANSMISSION

(75) Inventor: Patrick Fischer, Paris (FR)

(73) Assignee: LG Electronics Inc., Seoul (KR)

( * ) Notice: Subject to any disclaimer, the term of this patent is extended or adjusted under 35 U.S.C. 154(b) by 878 days.

(21) Appl. No.: 12/532,627

(22) PCT Filed: Mar. 26, 2008

(86) PCT No.: PCT/KR2008/001691
§ 371 (c)(1),
(2), (4) Date: Sep. 22, 2009

(87) PCT Pub. No.: WO2008/117986
PCT Pub. Date: Oct. 2, 2008

(65) Prior Publication Data
US 2010/0111058 A1    May 6, 2010

Related U.S. Application Data

(60) Provisional application No. 60/908,150, filed on Mar. 26, 2007.

(51) Int. Cl.
| | |
|---|---|
| H04W 4/00 | (2009.01) |
| H04B 7/212 | (2006.01) |
| H04B 7/005 | (2006.01) |
| G01R 31/08 | (2006.01) |
| H04J 3/24 | (2006.01) |

(52) U.S. Cl.
USPC .......... 370/338; 370/347; 370/230; 370/278; 370/474

(58) Field of Classification Search
USPC ................ 370/338, 347, 395.54, 230, 278, 370/474
See application file for complete search history.

(56) References Cited

U.S. PATENT DOCUMENTS

| | | | |
|---|---|---|---|
| 2003/0002532 A1 * | 1/2003 | Huo | 370/474 |
| 2003/0118031 A1 * | 6/2003 | Classon et al. | 370/395.54 |
| 2004/0120253 A1 * | 6/2004 | Forssell et al. | 370/230 |
| 2004/0185918 A1 | 9/2004 | Fan et al. | |
| 2005/0176474 A1 | 8/2005 | Lee et al. | |
| 2007/0291728 A1 * | 12/2007 | Dalsgaard et al. | 370/347 |
| 2008/0159183 A1 * | 7/2008 | Lindoff et al. | 370/278 |

FOREIGN PATENT DOCUMENTS

| | | |
|---|---|---|
| EP | 01499144 A1 | 1/2005 |
| WO | 2007024095 A2 | 3/2007 |
| WO | 2007025138 A2 | 3/2007 |

* cited by examiner

*Primary Examiner* — Ian N Moore
*Assistant Examiner* — Kiet Tang
(74) *Attorney, Agent, or Firm* — Lee, Hong, Degerman, Kang & Waimey

(57) ABSTRACT

The present invention relates to communicating between a network and a mobile terminal in a wireless communication system. The invention includes receiving a coded data unit from a network, determining whether the coded data unit can be successfully decoded, determining not to receive a transmission from the network for a first predetermined amount of time independent of whether the data unit is successfully decoded, and determining not to receive a transmission from the network for a second predetermined amount of time when the data unit is successfully decoded.

15 Claims, 16 Drawing Sheets

PRIOR ART

PRIOR ART

PRIOR ART

Logical channels mapped onto transport channels, seen from the UE side

Logical channels mapped onto transport channels, seen from the UTRAN side
PRIOR ART UE State Transitions
PRIOR ART

PRIOR ART

PRIOR ART

PRIOR ART

PRIOR ART

DISCONTINUOUS RECEPTION OPERATION DURING CONTINUOUS TRANSMISSION

CROSS-REFERENCE TO RELATED APPLICATIONS

This application is the National Stage filing under 35 U.S.C. 371 of International Application No. PCT/KR2008/001691, filed on Mar. 26, 2008. International Application No. PCT/KR2008/001691 also claims the benefit of earlier filing date to U.S. Provisional Application No. 60/908,150, filed on Mar. 26, 2007, the contents of which are hereby incorporated by reference herein in their entirety.

TECHNICAL FIELD

The present invention relates to communicating between a network and a mobile terminal in a wireless communication system, and more particularly, to a discontinuous reception operation during continuous transmission.

BACKGROUND ART

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for stand-ardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the Iub interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the Iur interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the Gf interface, to the MSC 6 via the GS interface, to the gateway GPRS support node (GGSN) 9 via the GN interface, and to the home subscriber server (HSS) via the GR interface.

The EIR 8 hosts lists of UEs 1 that are allowed to be used on the network. The EIR 8 also hosts lists of UEs 1 that are not allowed to be used on the network.

The MSC 6, which controls the connection for circuit switched (CS) services, is connected towards the media gateway (MGW) 11 via the NB interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the GC interface and to the Internet via the GI interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH) or a shared channel control channel.

The BCCH provides information including information utilized by a terminal to access a system. The PCCH is used by the UTRAN to access a terminal.

For the purposes of a multimedia broadcast/multicast service (MBMS) additional traffic and control channels are introduced in the MBMS standard. The MCCH (MBMS point-to-multipoint control channel) is used for transmission of MBMS control information. The MTCH (MBMS point-to-multipoint traffic channel) is used for transmitting MBMS service data. The MSCH (MBMS Scheduling Channel) is used to transmit scheduling information. The different logical channels that exist are listed in FIG. 3.

The MAC layer is connected to the physical layer by transport channels and can be divided into a MAC-b sub-layer, a MAC-d sub-layer, a MAC-c/sh sub-layer, a MAC-hs sub-layer and a MAC-m sublayer according to the type of transport channel being managed. The MAC-b sub-layer manages a BCH (broadcast channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink the radio access channel (RACH). The MAC-m sublayer may handle the MBMS data.

The possible mapping between the logical channels and the transport channels from a UE perspective is given in FIG. 4. The possible mapping between the logical channels and the transport channels from a UTRAN perspective is given in FIG. 5.

The MAC-d sub-layer manages a dedicated channel (DCH), which is a dedicated transport channel for a specific terminal. The MAC-d sublayer is located in a serving RNC (SRNC) that manages a corresponding terminal. One MAC-d sublayer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). Additionally the RRC handles user mobility within the RAN and additional services, such as location services.

The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods.

The different possibilities that exist for the mapping between the radio bearers and the transport channels for a given UE are not all possible all the time. The UE and UTRAN deduce the possible mapping depending on the UE state and the procedure that the UE and UTRAN are executing. The different states and modes are explained in more detail below, as far as they concern the present invention.

The different transport channels are mapped onto different physical channels. For example, the RACH transport channel is mapped on a given PRACH, the DCH can be mapped on the DPCH, the FACH and the PCH can be mapped on a secondary common control physical channel (S-CCPCH), and the DSCH is mapped on the PDSCH. The configuration of the physical channels is given by RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode.

Because an RRC connection exists for terminals in RRC connected mode, the UTRAN can determine the existence of a particular terminal within the unit of cells. For example, the UTRAN can determine in which cell or set of cells an RRC connected mode terminal is located and to which physical channel the UE is listening. Thus, the terminal can be effectively controlled.

In contrast, the UTRAN cannot determine the existence of a terminal in idle mode. The existence of idle mode terminals can only be determined by the core network to be within a region that is larger than a cell, for example, a location or a routing area. Therefore, the existence of idle mode terminals is determined within large regions, and in order to receive mobile communication services such as voice or data, the idle mode terminal must move or change into the RRC connected mode. The possible transitions between modes and states are shown in FIG. 6.

A UE in RRC connected mode can be in different states, such as CELL_FACH state, CELL_PCH state, CELL_DCH state, or URA_PCH state. Depending on the state, the UE carries out different actions and listens to different channels.

For example, a UE in CELL_DCH state will try to listen to DCH type of transport channels, among others. DCH types of transport channels include DTCH and DCCH transport channels, which can be mapped to a certain DPCH, DPDSCH or other physical channels.

The UE in CELL_FACH state will listen to several FACH transport channels, which are mapped to a certain S-CCPCH. A UE in PCH state will listen to the PICH channel and the PCH channel, which are mapped to a certain S-CCPCH physical channel.

The main system information is sent on the BCCH logical channel which is mapped on a P-CCPCH (primary common control physical channel). Specific system information blocks can be sent on the FACH channel. When the system information is sent on FACH, the UE receives the configuration of the FACH either on the BCCH that is received on P-CCPCH or on a dedicated channel. When system information is sent on the BCCH (i.e., via the P-CCPCH), then in each frame or set of two frames the SFN (system frame number) is sent which is used in order to share the same timing reference between the UE and the Node-B. The P-CCPCH is sent using the same scrambling code as the P-CPICH (primary common pilot channel), which is the primary scrambling code of the cell. The spreading code that is used by the P-CCPCH is of a fixed SF (spreading factor) 256, and the number is one. The UE knows about the primary scrambling code either by information sent from the network on system information of neighboring cells that the UE has read, by messages that the UE has received on the DCCH channel, or by searching for the P-CPICH, which is sent using the fixed SF 256, the spreading code number 0 and which transmits a fixed pattern.

The system information comprises information on neighboring cells, configuration of the RACH and FACH transport channels, and the configuration of MICH and MCCH which are channels that are dedicated channels for the MBMS service.

Each time the UE changes the cell it is camping (in idle mode) or when the UE has selected the cell (in CELL_FACH, CELL_PCH or URA_PCH state), the UE verifies that it has valid system information. The system information is organized in SIBs (system information blocks), a MIB (master information block) and scheduling blocks. The MIB is sent very frequently and gives timing information of the scheduling blocks and the different SIBs. For SIBs that are linked to a value tag, the MIB also contains information on the last version of a part of the SIBs. SIBs that are not linked to a value tag are linked to an expiration timer. SIBs linked to an expiration timer become invalid and need to be reread if the time of the last reading of the SIB is larger than this timer value. SIBs linked to a value tag are only valid if they have the same value tag as the one broadcast in the MIB. Each block has an area scope of validity (cell, PLMN, equivalent PLMN) which signifies on which cells the SIB is valid. A SIB with area scope "cell" is valid only for the cell in which it has been read. A SIB with area scope "PLMN" is valid in the whole PLMN, a SIB with the area scope "equivalent PLMN" is valid in the whole PLMN and equivalent PLMN.

In general UEs read the system information when they are in idle mode, CELL_FACH state, CELL_PCH state or in URA_PCH state of the cells that they have selected or the cell that they are camping on. In the system information, they receive information on neighboring cells on the same frequency, different frequencies and different RAT (radio access technologies). This allows the UE to know which cells are candidates for cell reselection.

MBMS is introduced in the UMTS standard in the Release 6 of the specification (Rel-6). It describes techniques for optimized transmission of MBMS bearer service including point-to-multipoint transmission, selective combining and transmission mode selection between point-to-multipoint and point-to-point bearers. This is used in order to save radio resources when the same content is sent to multiple users, and enables TV-like services. MBMS data can be split into two categories, control plane information and user plane information. The control plane information contains information on the physical layer configuration, transport channel configuration, radio bearer configuration, ongoing services, counting information, scheduling information, and the like. In order to allow UEs to receive this information, MBMS bearer specific control information for the MBMS is sent to the UEs.

The user plane data of MBMS bearers can be mapped onto dedicated transport channels for a point-to-point service which is sent only to one UE, or on a shared transport channel for point to multipoint service which is transmitted to (and received by) several users at the same time.

Point-to-point transmission is used to transfer MBMS specific control/user plane information, as well as dedicated control/user plane information between the network and a UE in RRC connected mode. It is used for the multicast or the broadcast mode of MBMS. DTCH is used for a UE in CELL_FACH and Cell_DCH. This allows existing mappings to transport channels.

To allow cell resources to be used in an optimized manner, a function called counting has been introduced in MBMS applications. The counting procedure is used to determine how many UEs are interested in the reception of a given service. This is done by using the counting procedure shown in FIG. 7.

For example, a UE that is interested in a certain service receives information of the availability of a MBMS service. The network can inform the UE that it should indicate to the network its interest in the service in the same way such as by transmitting the "access information" on the MCCH channel. A probability factor included in the access information message determines that an interested UE will only respond with a given probability. In order to inform the network that the UE is interested in a given service, the UE will send to the network the RRC connection setup message or the cell update message in the cell that the UE has received the counting information. This message may potentially include an identifier indicating the service that the UE is interested in.

In the case that the network operates on several frequencies, when a UE is camping on one frequency, and a MBMS service is transmitted on a different frequency, a UE may not be aware of the fact that a MBMS service is transmitted in the different frequency. Therefore a frequency convergence procedure allows the UE to receive information in frequency A that indicates in a frequency B that a given service is available.

In general, an MBMS point-to-multipoint Control Channel (MCCH) is a logical channel used for a point-to-multipoint downlink transmission of control plane in-formation between a network and UEs in RRC Connected or Idle Mode. The control plane information on MCCH is MBMS specific and is sent to the UEs in a cell with an activated MBMS service. The MCCH can be sent in the S-CCPCH carrying the DCCH of the UEs in CELL_FACH state, or in a standalone S-CCPCH, or in the same S-CCPCH with MTCH.

The MCCH is mapped to a specific FACH in the S-CCPCH as indicated on the BCCH. In case of soft combining, the MCCH is mapped to a different S-CCPCH (CCTrCH in TDD) than MTCH. Reception of paging has priority over the reception of the MCCH for Idle mode and URA/CELL_PCH UEs. The configuration of the MCCH (modification period, repetition period, etc.) is configured in the system information sent on the BCCH.

In general, an MBMS point-to-multipoint Traffic Channel (MTCH) is a logical channel used for a point-to-multipoint downlink transmission of user plane information between a network and UEs in RRC Connected or Idle Mode. The user plane information on MTCH is MBMS Service specific and is sent to the UEs in a cell with an activated MBMS service. The MTCH is mapped to a specific FACH in the S-CCPCH as indicated on the MCCH.

In general, an MBMS point-to-multipoint Scheduling Channel (MSCH) is a logical channel used for a point-to-multipoint downlink transmission of an MBMS service transmission schedule between a network and UEs in RRC Connected or Idle Mode. Control plane information on MSCH is MBMS service and S-CCPCH specific and is sent to the UEs in a cell receiving MTCH. An MSCH is sent in each S-CCPCH carrying the MTCH. The MSCH is mapped to a specific FACH in the S-CCPCH as indicated on the MCCH. Due to different error requirements, the MSCH is mapped to a FACH different from the MTCH.

In general, FACH is used as a transport channel for MTCH, MSCH and MCCH. Moreover, S-CCPCH is used as a physical channel for FACH carrying the MTCH, MSCH or MCCH.

In general, the following connections between logical channels and transport channels exist only in downlink: 1) MCCH can be mapped to FACH; 2) MTCH can be mapped to FACH; and 3) MSCH can be mapped to FACH. The mappings as seen from the UE and UTRAN sides are shown in FIG. 8 and FIG. 9, respectively.

For MCCH, the RLC mode to be employed is UM-RLC, with required enhancements to support out-of-sequence SDU delivery. A MAC header is used for logical channel type identification.

For MTCH, the RLC mode to be employed is UM-RLC, with required enhancements to support selective combining. Quick repeat may be used in RLC-UM. A MAC header is used for logical channel type identification and MBMS service identification.

For MSCH, the RLC mode to be employed is UM-RLC. A MAC header is used for logical channel type identification.

MBMS notification utilizes an MBMS specific PICH called an MBMS Notification Indicator Channel (MICH) in a cell. Coding for the MICH is defined in Stage-3 physical layer specifications.

In general, MCCH information is transmitted based on a fixed schedule, wherein the schedule identifies the TTI (Transmission Time interval), i.e., multiple of frames containing the beginning of the MCCH information. The transmission of the MCCH information can take a variable number of TTIs, and the UTRAN preferably transmits the MCCH information in consecutive TTIs. The UE will continue to receive the S-CCPCH until: 1) the UE receives all of the MCCH information; 2) the UE receives a TTI that does not include any MCCH data; or 3) information contents indicate that further reception is not required (e.g., no modification to the desired service information).

Based on this behavior, the UTRAN can repeat the MCCH information following a scheduled transmission in order to improve reliability. The MCCH schedule is common for all services.

All MCCH information will be transmitted periodically based on a "repetition period". A "modification period" is defined as an integer multiple of the repetition period. MBMS ACCESS INFORMATION may be transmitted periodically based on an "access info period", which is an integer divider of the "repetition period". The values for the repetition period and modification period are given in the system information of the cell in which MBMS is sent.

MCCH information is split into critical and non-critical information. The critical information is made up of MBMS NEIGHBORING CELL INFORMATION, MBMS SERVICE INFORMATION and MBMS RADIO BEARER INFORMATION. The non-critical information corresponds to MBMS ACCESS INFORMATION. Changes to the critical information are applied at the first MCCH transmission of a modification period and at the beginning of each modification period. The UTRAN transmits MBMS CHANGE INFORMATION including MBMS services IDs whose MCCH information is modified at that modification period. The MBMS CHANGE INFORMATION is repeated at least once in each repetition period of that modification period. Changes to non-critical information can take place at any time.

FIG. 10 illustrates the schedule with which the MBMS SERVICE INFORMATION and RADIO BEARER INFORMATION is transmitted. Different block patterns indicate potentially different MCCH content.

In order to increase coverage, a UE which is located between different cells can receive the same MBMS services from different cells at the same time, and combine the received information as shown in FIG. 11. In this case, the UE reads the MCCH from a cell it has selected based on a certain algorithm.

Referring to FIG. 11, on the MCCH from the selected cell (e.g., cell A-B), the UE receives information on a service that the UE is interested in. This information contains information related to the configuration of physical channels, transport channels, an RLC configuration, a PDCP configuration, etc. of the current cell, and neighboring cells that the UE might be able to receive (e.g., cell A-A and cell B). In other words, the received information contains information that the UE needs in order to receive an MTCH carrying a service that the UE is interested in cells A-A, A-B and B.

When the same service is transported on different cells, the UE may or may not be able to combine the service from the different cells. In case that combining is possible, the combining is performed at different levels: 1) no combining possible; 2) selective combining at RLC level; and 3) L1 combining at physical level.

Selective combining for an MBMS point-to-multipoint transmission is supported by RLC PDU numbering. Therefore, selective combining in the UE is possible from cells providing similar MBMS RB bit rates, provided that de-synchronization between MBMS point-to-multipoint transmission streams does not exceed the RLC re-ordering capability of the UE. Thus, there exists one RLC entity in the UE side.

For selective combining, there exists one RLC entity per MBMS service utilizing a point-to-multipoint transmission in the cell group of the CRNC. All cells in the cell group are under the same CRNC. In case de-synchronization occurs between MBMS transmissions in neighboring cells belonging to an MBMS cell group, the CRNC may perform re-synchronization actions enabling UEs to perform the selective combining between these cells.

For time division duplexing (TDD), selective combining and soft combining can be used when Node-Bs are synchronized. For frequency division duplexing (FDD), soft combining can be used when Node-Bs are synchronized inside a UE's soft combining reception window, and the data fields of the soft combined S-CCPCHs are identical during soft combining moments.

When selective or soft combining is available between cells, the UTRAN sends MBMS NEIGHBORING CELL INFORMATION containing the MTCH configuration of the neighboring cells available for selective or soft combining. When partial soft combining is applied, the MBMS NEIGHBORING CELL INFORMATION contains an L1-combining schedule, which indicates the moments in time when the UE may soft combine the S-CCPCH transmitted in neighboring cells with the S-CCPCH transmitted in a serving cell. With MBMS NEIGHBORING CELL INFORMATION, the UE is able to receive an MTCH transmission from neighboring cells without receiving the MCCH of these neighboring cells.

The UE determines the neighboring cell suitable for selective or soft combining based on a threshold (e.g., measured CPICH Ec/No) and the presence of MBMS NEIGHBORING CELL INFORMATION of that neighboring cell. The possibility of performing selective or soft combining is signaled to the UE.

The long-term evolution (LTE) of UMTS is under discussion by the 3rd generation partnership project (3GPP) that standardized UMTS. The 3GPP LTE is a technology for enabling high-speed packet communications. Many schemes have been proposed for the LTE objective including those that aim to reduce user and provider costs, improve service quality, and expand and improve coverage and system capacity.

FIG. 12 illustrates the architecture of an LTE system. Each aGW 115 is connected to one or several access Gateways (aGW) 115. An aGW 115 is connected to another Node (not shown) that allows access to the Internet and/or other networks, such as GSM, UMTS, and WLAN.

The 3GPP LTE requires reduced cost per bit, increased service availability, flexible use of a frequency band, a simple structure, an open interface, and adequate power consumption of a terminal as an upper-level requirement. Generally, The UTRAN 2 corresponds to E-UTRAN (Evolved-UTRAN). The NodeB 5 and/or RNC 4 correspond to e-NodeB (eNB) 105 in the LTE system.

In 3GPP LTE systems, system information (SI) carries different cell and network specific parameters to a UE for successful attachment to a network. The system information also facilitates paging and allows the UE to use different network services. Every cell continually broadcasts its system information on a channel, such as a broadcast control channel (BCCH). Moreover, every UE registering to the network or performing a handover to a particular cell first reads the cell specific information.

Discontinuous Reception (DRX) is a method used in mobile communication to conserve the battery life of the mobile terminal. Generally, the mobile terminal and the network negotiate periods in which data transfer occurs. During other periods, the mobile terminal turns its receiver off and enters a low power state.

DISCLOSURE OF INVENTION

Technical Solution

The present invention is related to a discontinuous reception operation during continuous transmission.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for communicating between a network and a mobile terminal in a wireless communication system, the method comprising receiving a coded data unit from a network, determining whether the coded data unit can be successfully decoded, determining not to receive a transmission from the network for a first predetermined amount of time independent of whether the data unit is successfully decoded, and determining not to receive a transmission from the network for a second predetermined amount of time when the data unit is successfully decoded.

In one aspect of the invention, the method further comprises providing acknowledgment to the network if the data unit is successfully decoded. In another aspect of the invention, the method further comprises receiving an indicator indicating that all segments of a segmented data unit have been transmitted by the network, determining whether all segments of the segmented data unit are successfully received and successfully decoded, and not receiving a transmission from the network for the first predetermined amount of time when all segments of the segmented data unit are successfully received and successfully decoded.

In a further aspect of the invention, the method further comprises receiving a first indicator indicating that all segments of a segmented data unit have been transmitted by the network, determining whether all segments of the segmented data unit are successfully received and successfully decoded, transmitting a second indicator to the network indicating a missing segment if all segments of the segmented data unit are not successfully received, successfully receiving a retransmission of the missing segment, and not receiving a transmission from the network for the first predetermined amount of time when all segments of the segmented data unit are successfully received and successfully decoded.

In accordance with another embodiment of the present invention, a method for communicating between a network and a mobile terminal in a wireless communication system comprises receiving a coded data unit from a network, determining whether the received data unit is a last data unit to be received when the data unit is successfully decoded, and determining not to receive a transmission from the network for a predetermined amount of time if the received data unit is the last data unit to be received.

Preferably, an RLC header of the received data unit indicates whether the received data unit is the last data unit to be received. Alternatively, a MAC header of the received data unit indicates whether the received data unit is the last data unit to be received. In one aspect of the invention, the method further comprises providing acknowledgment (ACK) to the network when the data unit is successfully decoded.

In accordance with another embodiment of the present invention, a method for communicating between a network and a mobile terminal in a wireless communication system comprises unsuccessfully receiving from a network a data packet to be received, providing the network with an indication of the unsuccessful reception of the data packet, determining not to receive a transmission from the network for a first predetermined amount of time independent of whether the data packet is successfully received, successfully receiving a retransmission of the data packet, transmitting an acknowledgment of the successful reception of the retransmitted data packet, and determining not to receive a transmission from the network for a second predetermined amount of time after transmitting the acknowledgment.

In accordance with another embodiment of the present invention, a method for communicating between a network and a mobile terminal in a wireless communication system comprises unsuccessfully receiving from a network a data packet to be received, providing the network with an indication of the unsuccessful reception of the data packet, waiting for a retransmission of the data packet to be received for a first predetermined amount of time, and determining not to receive a transmission from the network for a second predetermined amount of time after the first predetermined amount of time expires.

In accordance with another embodiment of the present invention, a method for communicating between a network and a mobile terminal in a wireless communication system comprises transmitting a coded data unit to a mobile terminal, determining not to transmit to the mobile terminal for a first predetermined amount of time independent of whether the data unit is successfully decoded by the mobile terminal, and determining not to transmit to the mobile terminal for a second predetermined amount of time when the data unit is successfully decoded by the mobile terminal.

In one aspect of the invention, the method further comprises receiving acknowledgment from the mobile terminal if the data unit is successfully decoded by the mobile terminal. In another aspect of the invention, the method further comprises transmitting an indicator indicating that all segments of a segmented data unit have been transmitted to the mobile terminal, and suspending transmission to the mobile terminal for the first predetermined amount of time when all segments of the segmented data unit are transmitted to the mobile terminal.

In a further aspect of the invention, the method further comprises transmitting a first indicator indicating that all segments of a segmented data unit have been transmitted to the mobile terminal, suspending transmission to the mobile terminal for the first predetermined amount of time when all segments of the segmented data unit are transmitted to the mobile terminal, receiving a second indicator from the mobile terminal indicating a missing segment if all segments of the segmented data unit are not successfully received by the mobile terminal, retransmitting the missing segment to the mobile terminal, and resuspending transmission to the mobile terminal for the first predetermined amount of time when the missing segment is retransmitted to the mobile terminal.

In accordance with another embodiment of the present invention, a method for communicating between a network and a mobile terminal in a wireless communication system comprises transmitting a coded data unit to a mobile terminal, wherein the data unit is a last data unit to be transmitted to the mobile terminal, and suspending transmission to the mobile terminal for a predetermined amount of time when the coded data unit is transmitted.

Preferably, an RLC header of the transmitted data unit indicates whether the transmitted data unit is the last data unit to be transmitted. Alternatively, a MAC header of the transmitted data unit indicates whether the transmitted data unit is the last data unit to be transmitted. In one aspect of the invention, the method further comprises receiving acknowledgment from the mobile terminal if the data unit is successfully decoded by the mobile terminal.

In accordance with another embodiment of the present invention, a method for communicating between a network and a mobile terminal in a wireless communication system comprises transmitting a data packet to a mobile terminal, receiving an indication indicating that the data packet was unsuccessfully received by the mobile terminal, suspending transmission to the mobile terminal for a first predetermined amount of time independent of whether the data packet is successfully received, retransmitting the data packet to the mobile terminal, receiving from the mobile terminal an acknowledgment of the successful reception of the retransmitted data packet, and suspending transmission to the mobile terminal for a second predetermined amount of time after receiving the acknowledgment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

MODE FOR THE INVENTION

The present invention relates to a discontinuous reception operation during continuous transmission in a wireless communication system.

Reference will now be made in detail to the preferred embodiments of the present invention, examples of which are illustrated in the accompanying drawings. Wherever possible, the same reference numbers will be used throughout the drawings to refer to the same or similar parts.

Currently, it is debated how to decide discontinuous reception (DRX) principles, and how to specify switching between DRX and non-DRX periods. Accordingly, the present invention optimizes a DRX operation with regard to a continuous transmission. Examples of a continuation transmission include e-mail transfer, video streaming, voice over Internet protocol (VoIP), and others. In these cases, a service data rate may be significantly larger than a data rate on a radio interface.

In a conventional DRX solution, DRX periods and paging occasions are configured with an offset and a period to a given reference time instant. Thus, data that arrives in between two time instants is buffered.

Figure 1:
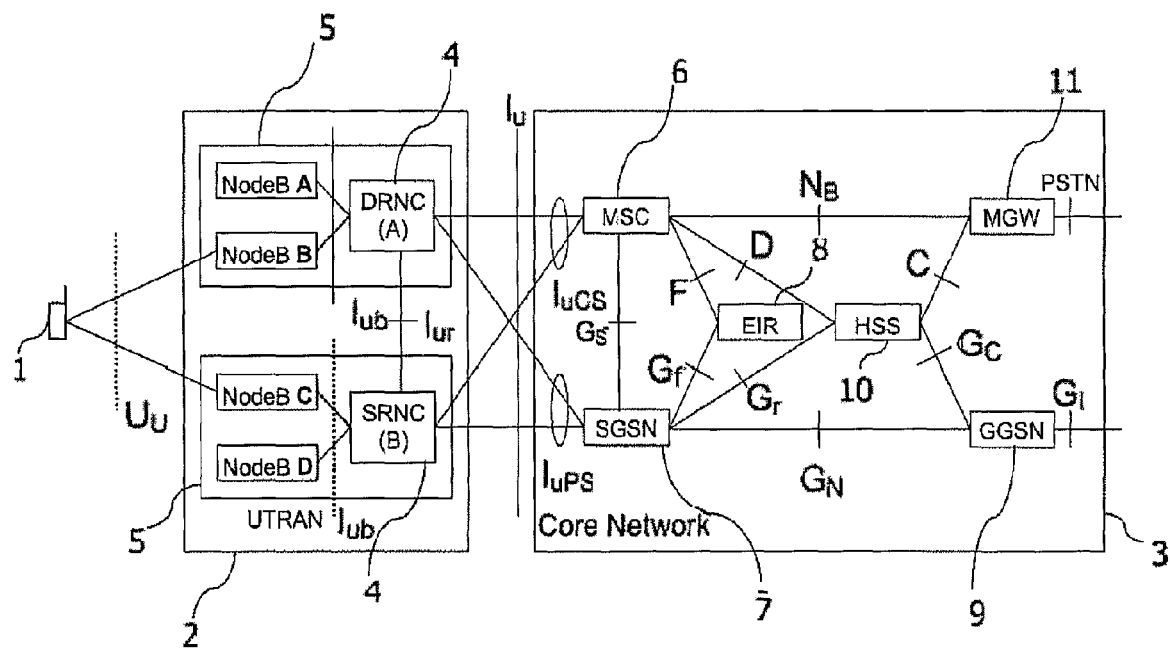
FIG. 1 illustrates a conventional UMTS network.
Figure 2:
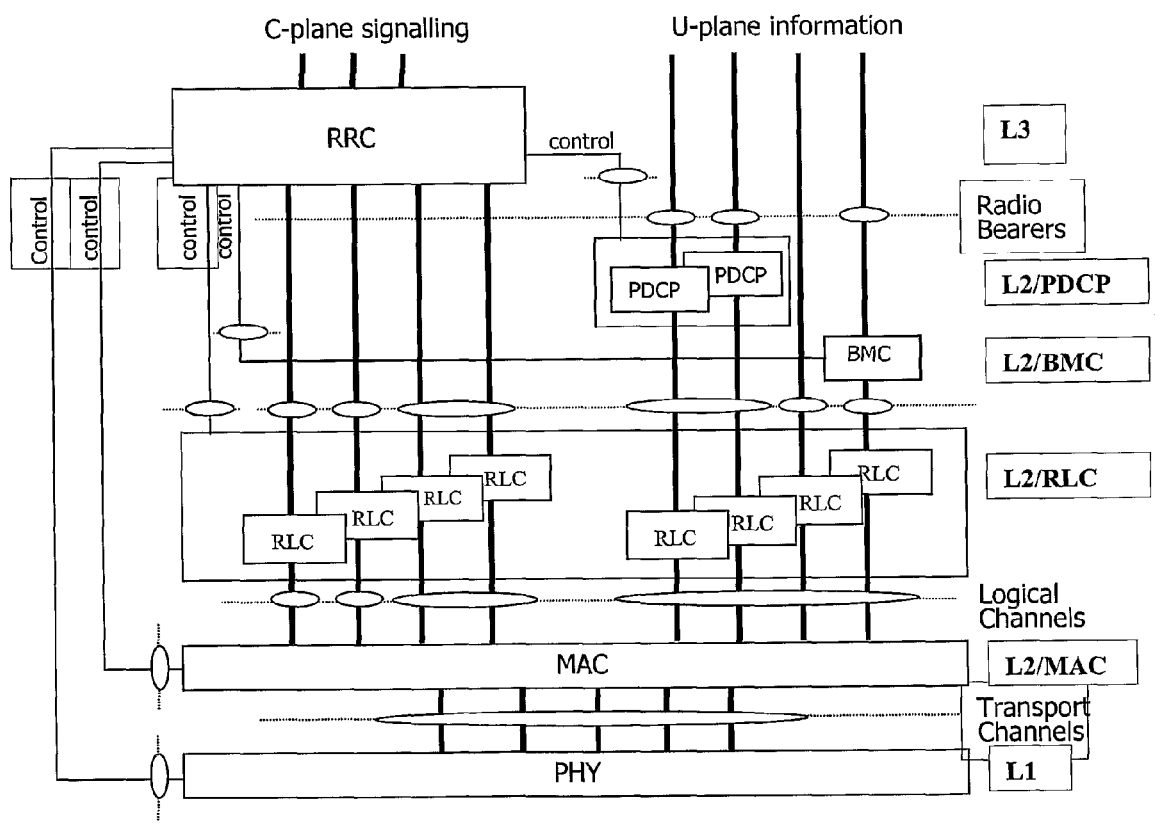
FIG. 2 illustrates a conventional radio interface protocol between a UE and UTRAN.
Figure 3:
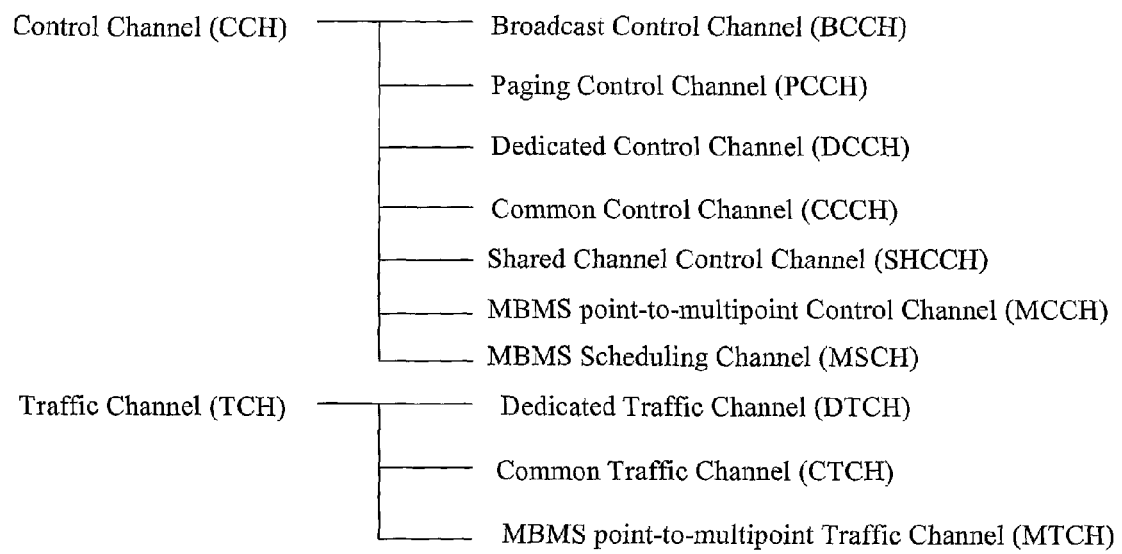
FIG. 3 illustrates logical channel structure.
Figure 4:
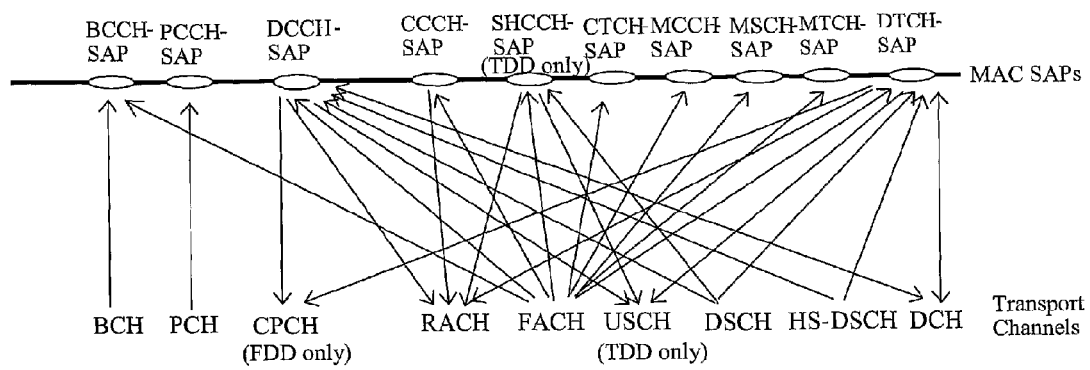
FIG. 4 illustrates possible mappings between logical channels and transport channels from the UE perspective.
Figure 5:
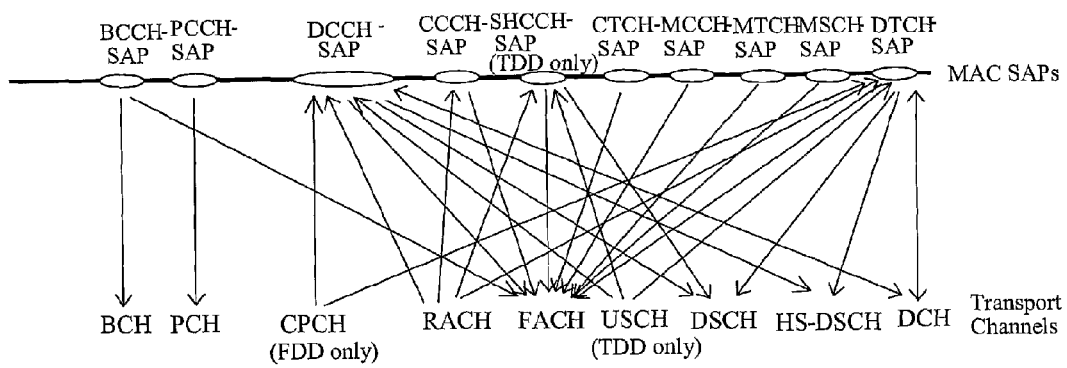
FIG. 5 illustrates possible mappings between logical channels and transport channels from the UTRAN perspective.
Figure 6:
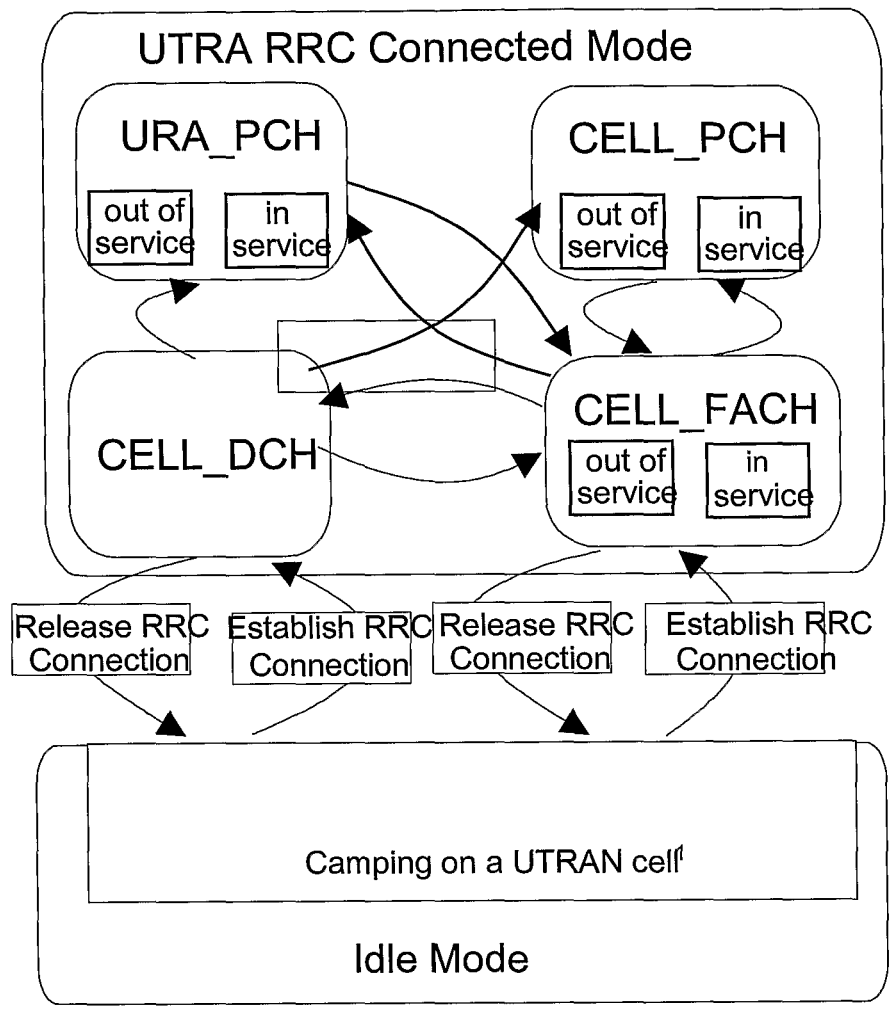
FIG. 6 illustrates possible UE state transitions.
Figure 7:
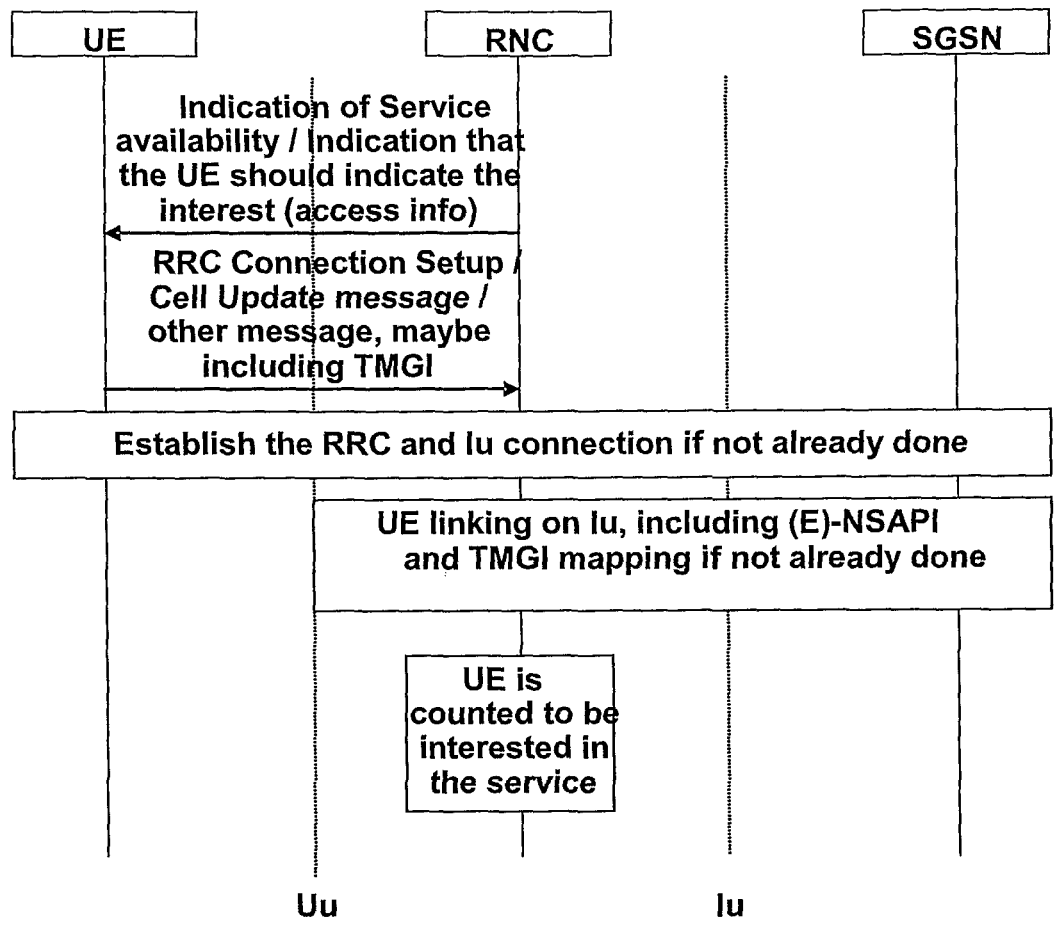
FIG. 7 illustrates a typical counting procedure.
Figure 8:
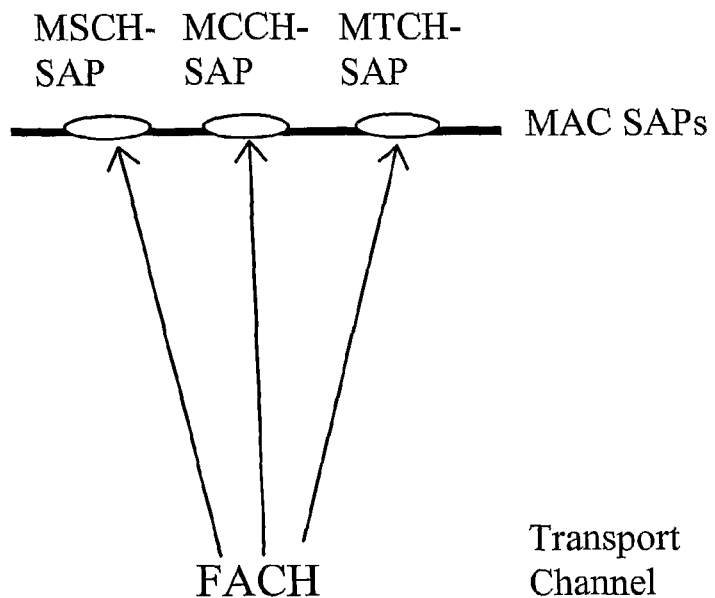
FIG. 8 illustrates mapping between logical channels and a transport channel as seen from the UE perspective.
Figure 9:
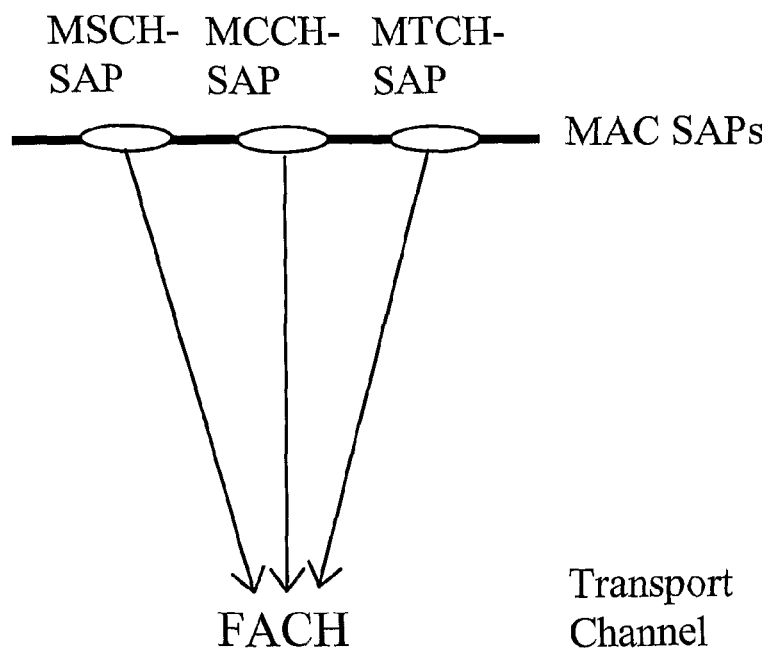
FIG. 9 illustrates mapping between logical channels and a transport channel as seen from the UTRAN perspective.
Figure 10:
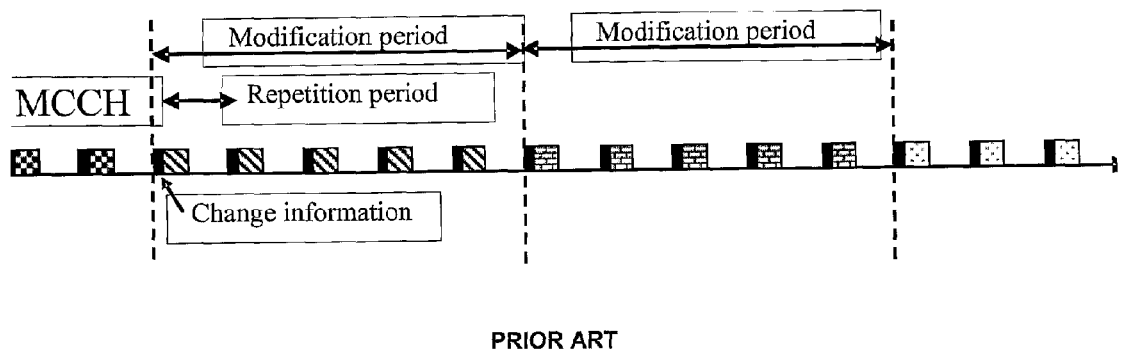
FIG. 10 illustrates a schedule with which the MBMS service information and radio bearer information is transmitted.
Figure 11:
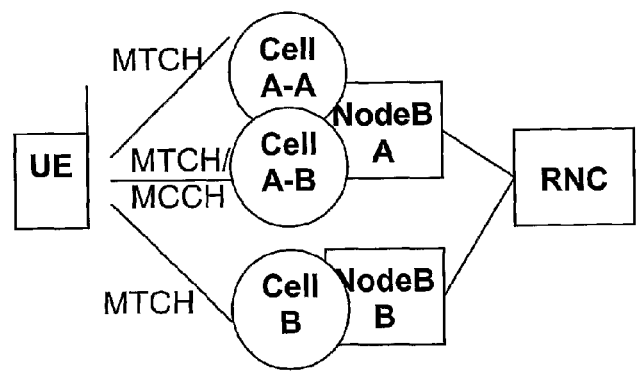
FIG. 11 illustrates a UE receiving MBMS service from several cells.
Figure 12:
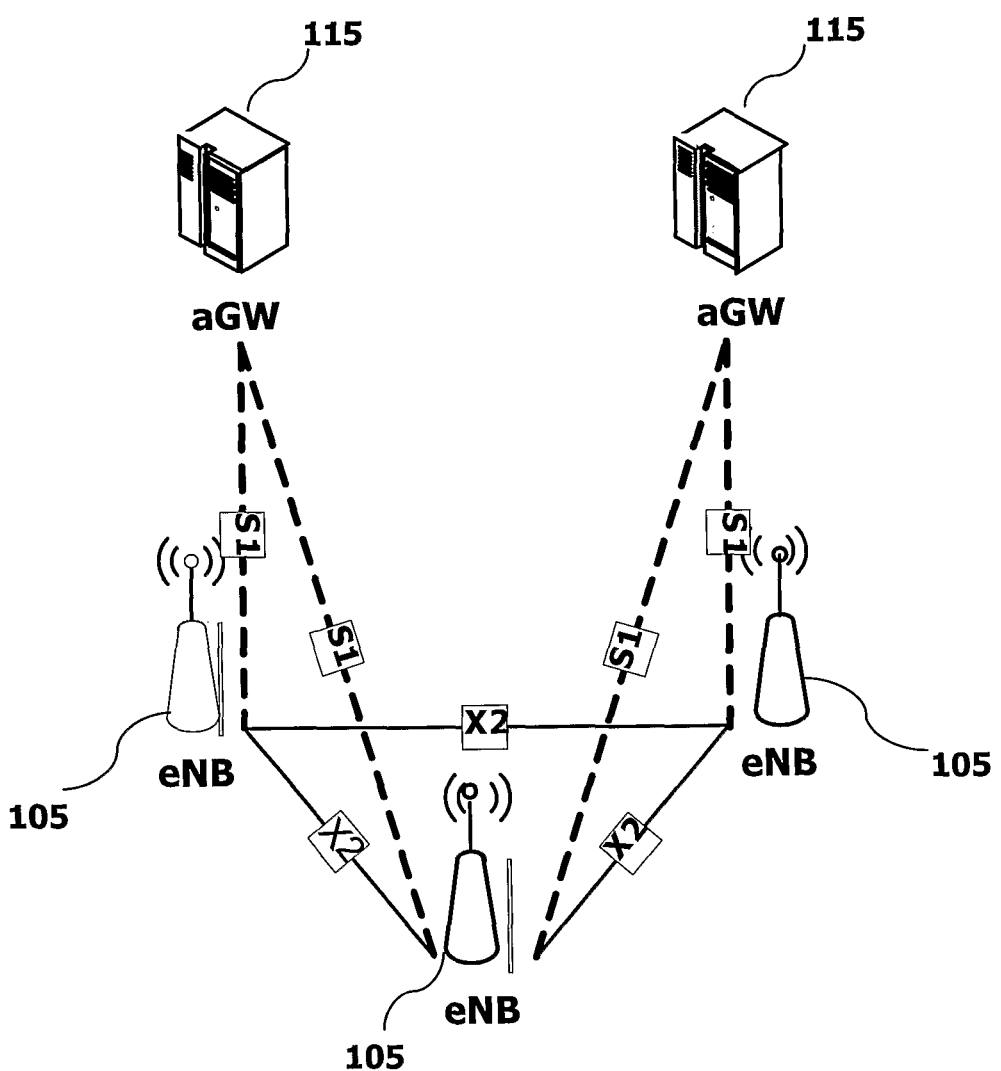
FIG. 12 illustrates the architecture of an LTE system.
Figure 13:
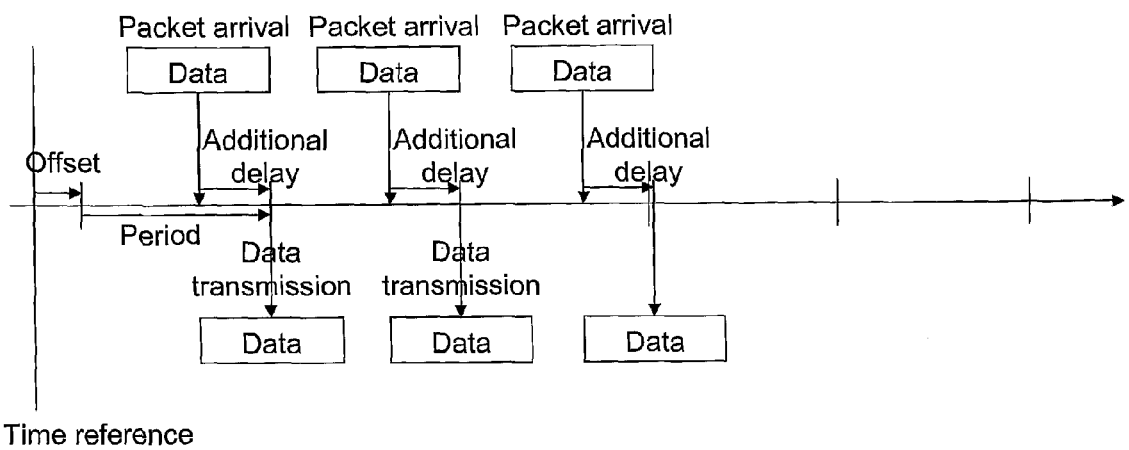
FIG. 13 illustrates a voice over Internet protocol (VoIP) transmission with regard to a DRX operation.

FIG. 13 illustrates a voice over Internet protocol (VoIP) transmission with regard to a DRX operation. Here, a DRX period of 20 msec is used, for example. Referring to FIG. 13, a fixed offset is scheduled at the beginning of a call/handover, which may need to be aligned due to other users arriving in, or leaving, the cell. Consequently, the scheduler has no flexiblity for scheduling but has to schedule a downlink transmission the moment the UE wakes up from a DRX state.

The offset may be regularly updated by implicitly aligning the offset to a last data reception, or by explicitly signaling the new DRX offset in a MAC PDU, for example. In order to allow the UE to perform a DRX period, the DRX period may have to be aligned to the period of packet generation.

In accordance with the present invention, during a continuous transmission, an average data rate for a user may be much lower than a data rate on an air interface. This may be due to a service with a limited data rate, such as a voice service or video service, for example. But even for services such as e-mail or file transfer, a typical data rate is much lower than the air interface data rate. This may be due to a limited server capacity or a limited data rate granted by the operator. With regard to DRX, such a case may be considered as a "No-DRX" state in terms of a conventional DRX method. Accordingly, the UE will have to continuously monitor the L1/2 control channel. However, it is evident that the UE will not receive data constantly, but that between each packet received by the UE, there is a short break to wait for the arrival of new data. Preferably, these short breaks may be used by the UE for DRX purposes.

Figure 14:
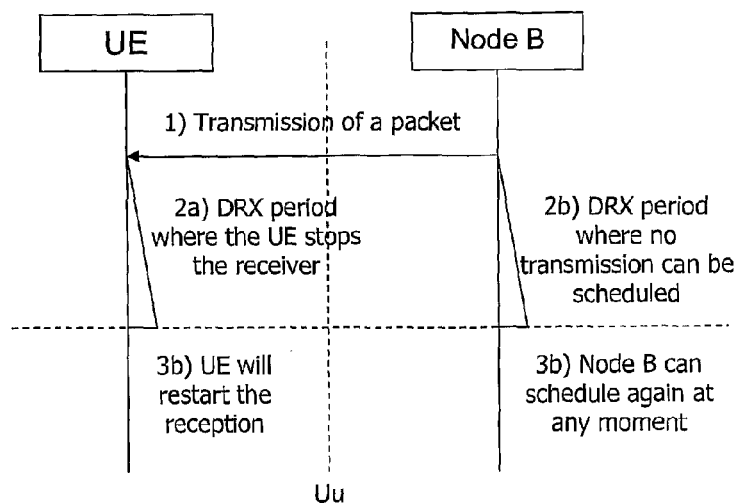
FIG. 14 illustrates a DRX period after receiving a packet in MAC in accordance with one embodiment of the present invention.

In accordance with one embodiment of the present invention, a break exists after receiving a packet. Therefore, it is preferable to trigger a sleeping period in the UE after receiving a packet, for example. FIG. 14 illustrates a DRX period after receiving a packet in MAC in accordance with one embodiment of the present invention. Referring to FIG. 14, after receiving the packet on the physical layer, the UE applies a predetermined DRX interval. The Node B, after transmitting the packet, will refrain from scheduling another transmission until the predetermined period expires.

Figure 15:
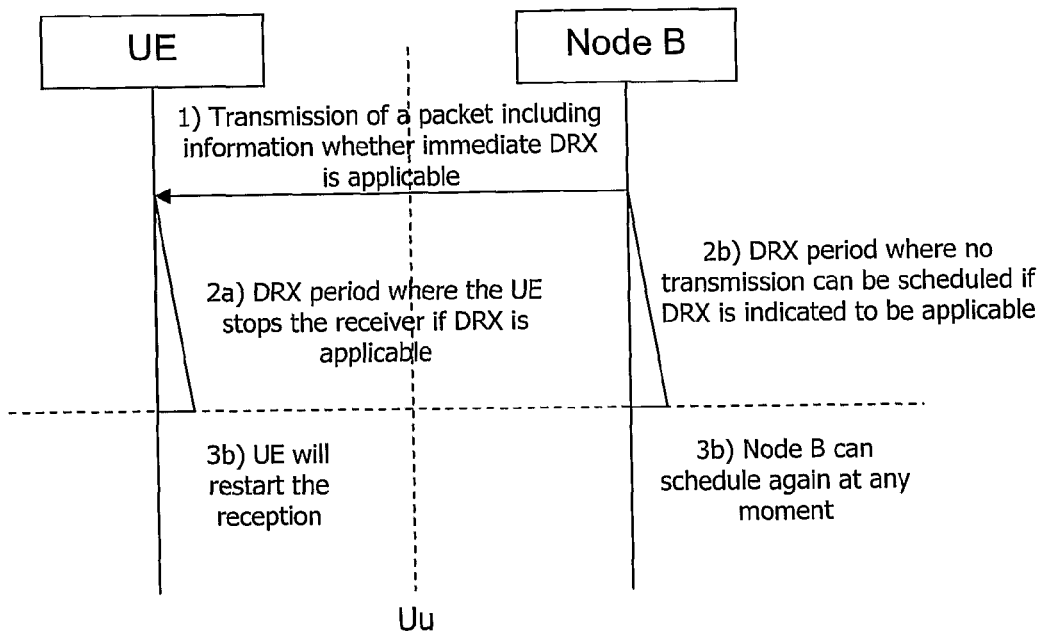
FIG. 15 illustrates a DRX period after receiving a packet in MAC including a DRX indication in accordance with one embodiment of the present invention.

In accordance with the present invention, a packet may be segmented by the RLC. In such a case, it may be preferable to wait for the reception of the complete RLC SDU before interrupting the reception. Accordingly, an indicator may be included in the RLC or MAC header to indicate whether a packet is the last packet in a buffer, i.e. an indication is provided to inform the UE that the UE may perform the predefined DRX period after receiving a particular packet, as shown in FIG. 15. Preferably, the Node B MAC/RLC includes the indication when the buffer is empty after the successful transmission of the last packet.

Figure 16:
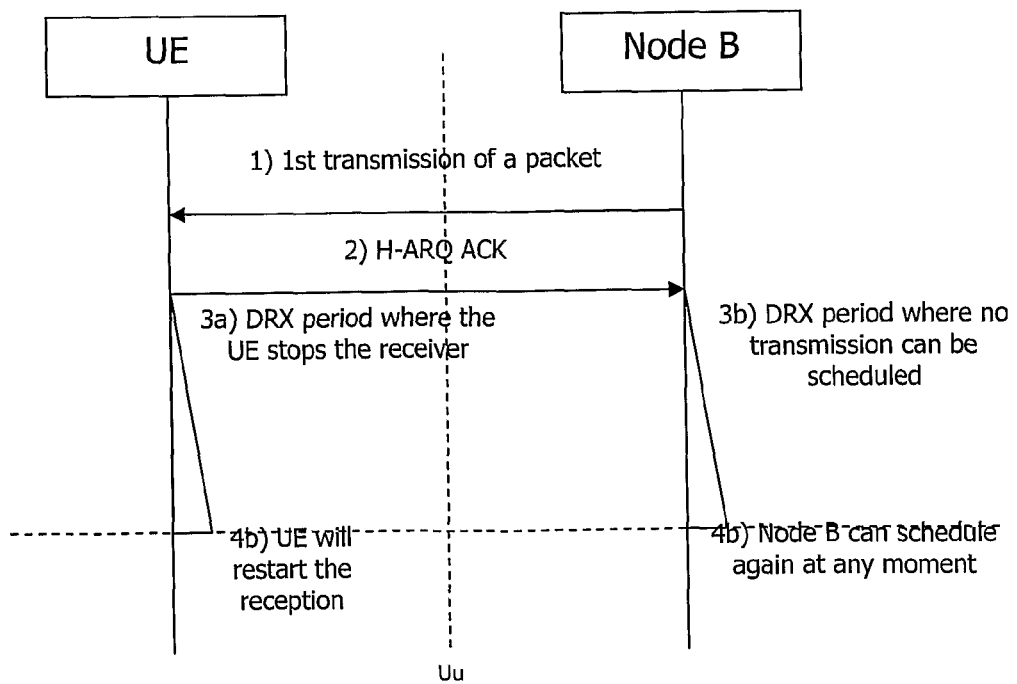
FIG. 16 illustrates a DRX period after receiving a packet in view of a HARQ operation in accordance with one embodiment of the present invention.

In accordance with the present invention, a HARQ operation may be combined with the DRX operation. FIG. 16 illustrates a DRX period after receiving a packet in view of a HARQ operation in accordance with one embodiment of the present invention. Notably, a HARQ operation may include retransmissions. Therefore, the UE can not go to a DRX state merely upon a first transmission of a packet. Rather, the UE must wait until the UE successfully receives the complete data packet. Accordingly, the UE transmits ACK or NACK packets to the network to indicate that the transmission was successful, or the network should retransmit, respectively. Referring to FIG. 16, the UE transmitting an ACK to indicate a successful transmission is shown. In FIG. 16, the UE/Node B starts the DRX period upon the transmission of the HARQ ACK. Alternatively, the DRX period may begin at another point in time, such as upon the transmission of the packet, for example, wherein the Node B would resume the transmission if a NACK is received from the UE. In another alternative, the DRX period may start when the UE successfully sends an RLC acknowledgment. Preferably, at the moment the Node B receives the acknowledgment, the Node B will refrain from transmitting during the predetermined period. Accordingly, due to the transmission delay of the HARQ ACK, and the transmission delay from the Node B, the UE can apply a shortly longer delay than the Node B.

Figure 17:
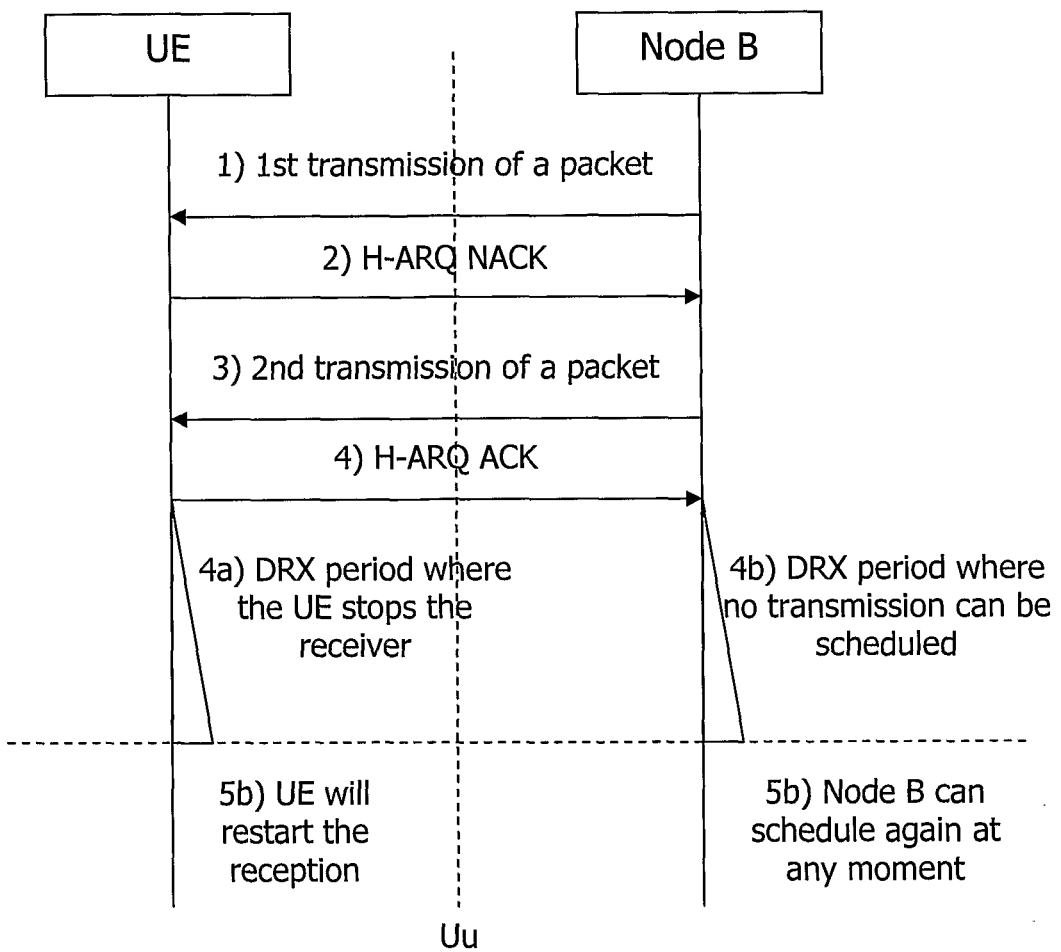
FIG. 17 illustrates a DRX period after receiving a packet in view of a HARQ operation and retransmission in accordance with one embodiment of the present invention.

FIG. 17 illustrates a DRX period after receiving a packet in view of a HARQ operation and retransmission in accordance with one embodiment of the present invention. Referring to FIG. 17, the UE applies the DRX operation after it has acknowledged successful receipt of the data packet. Furthermore, if parallel transmissions exist, i.e. the UE receives a transmission for a different HARQ process before the transmission of the first packet is acknowledged, the UE preferably does not apply the DRX operation until there is no packet to be retransmitted by the Node B. Thus, an ACK must have been transmitted for all packets for which at least one transmission has been received.

Figure 18:
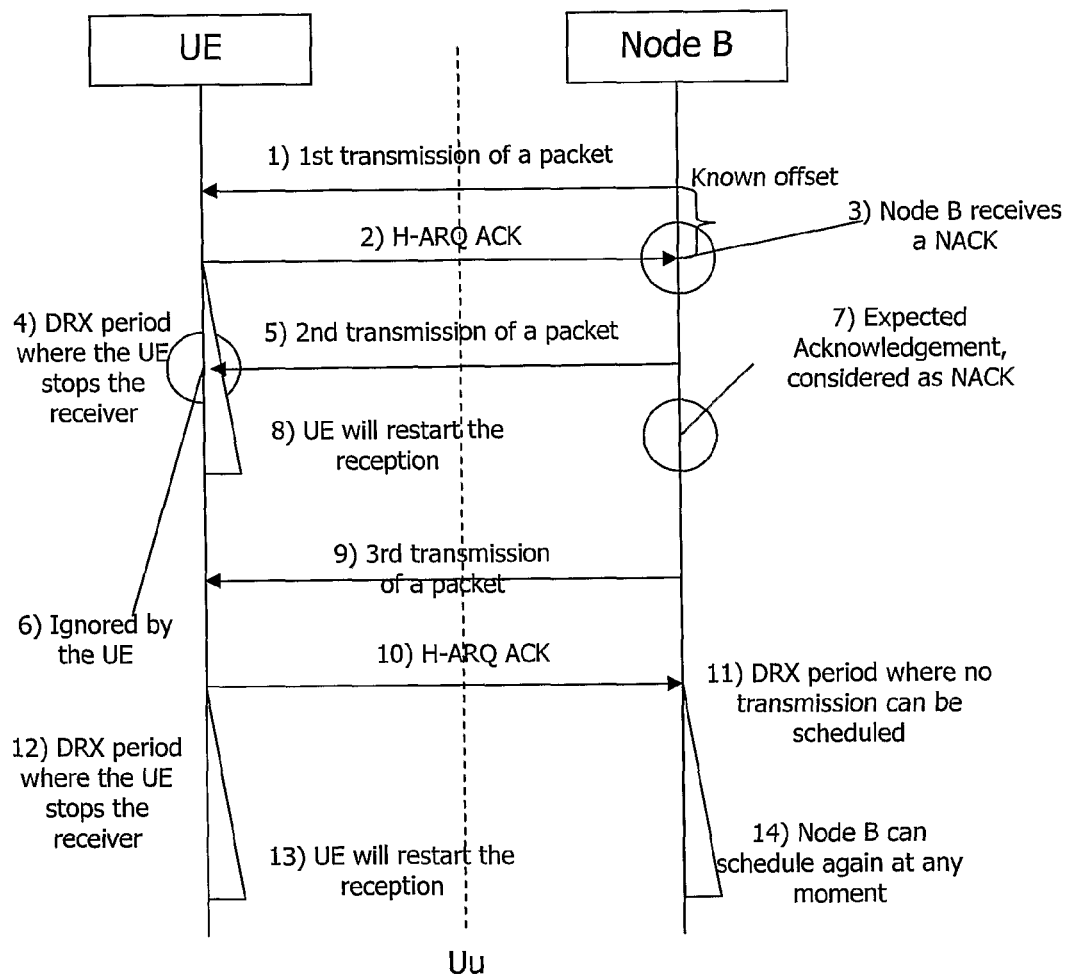
FIG. 18 illustrates a DRX period after receiving a packet in view of a HARQ operation and ACK to NACK error in accordance with one embodiment of the present invention.

FIG. 18 illustrates a DRX period after receiving a packet in view of a HARQ operation and ACK to NACK error in accordance with one embodiment of the present invention. Referring to FIG. 18, the UE transmits an ACK to acknowledge the successful receipt of a packet; however, the Node B erroneously receives a NACK for the transmission of the packet. Accordingly, the UE will begin applying DRX (step 4) while the Node B retransmits the packet. Preferably, the Node B will continue to retransmit until a maximum number of retransmissions have been reached, or until the UE's DRX period ends and the UE retransmits the ACK due to the next reception of a data block the UE successfully receives (step 10). As a result, the UE and the Node B reapply the DRX beginning from the last transmission/reception of the ACK. Hence, in accordance with the present invention, a trigger for a DRX period may be when the UE correctly receives a packet in MAC, or when the UE transmits and ACK.

Figure 19:
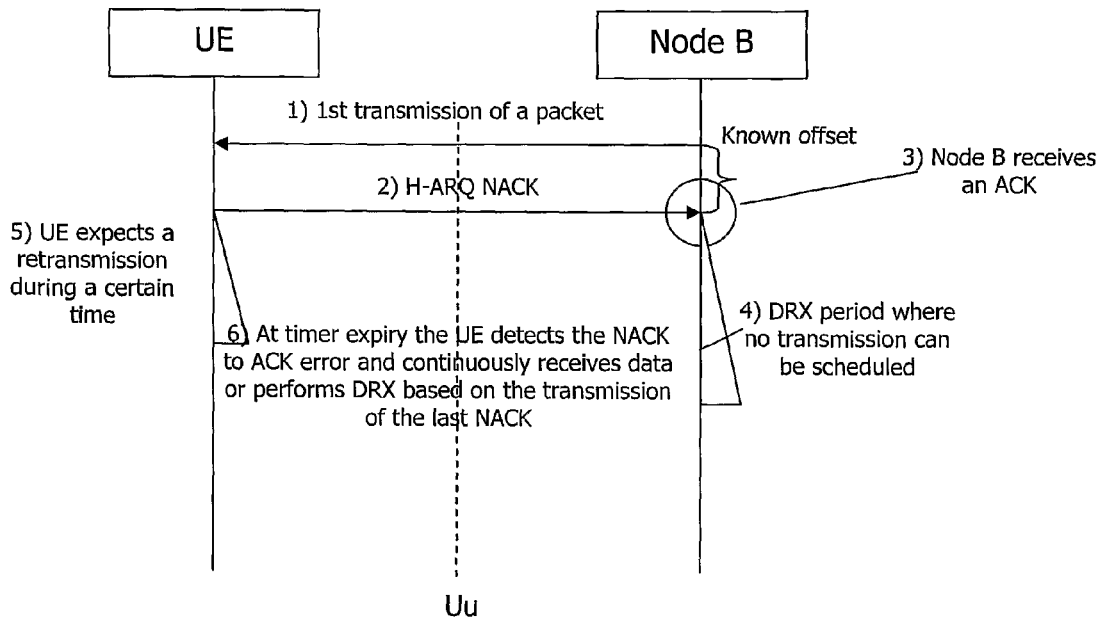
FIG. 19 illustrates a DRX period after receiving a packet in view of a HARQ operation and NACK to ACK error in accordance with one embodiment of the present invention.

FIG. 19 illustrates a DRX period after receiving a packet in view of a HARQ operation and NACK to ACK error in accordance with one embodiment of the present invention. Referring to FIG. 19, if the UE transmits a NACK after receiving a packet that the UE cannot decode (step 2), the UE will expect and wait for a retransmission. However, if the Node B misinterprets the NACK as an ACK (step 3), the Node B will refrain from transmitting for a predetermined amount of time. After waiting for the retransmission, and not receiving the retransmission after a certain amount of time, the UE will determine that the NACK was misinterpreted as an ACK. As a result, the UE will apply a DRX period beginning from the transmission of the NACK as if the UE had sent an ACK in step 2.

Figure 20:
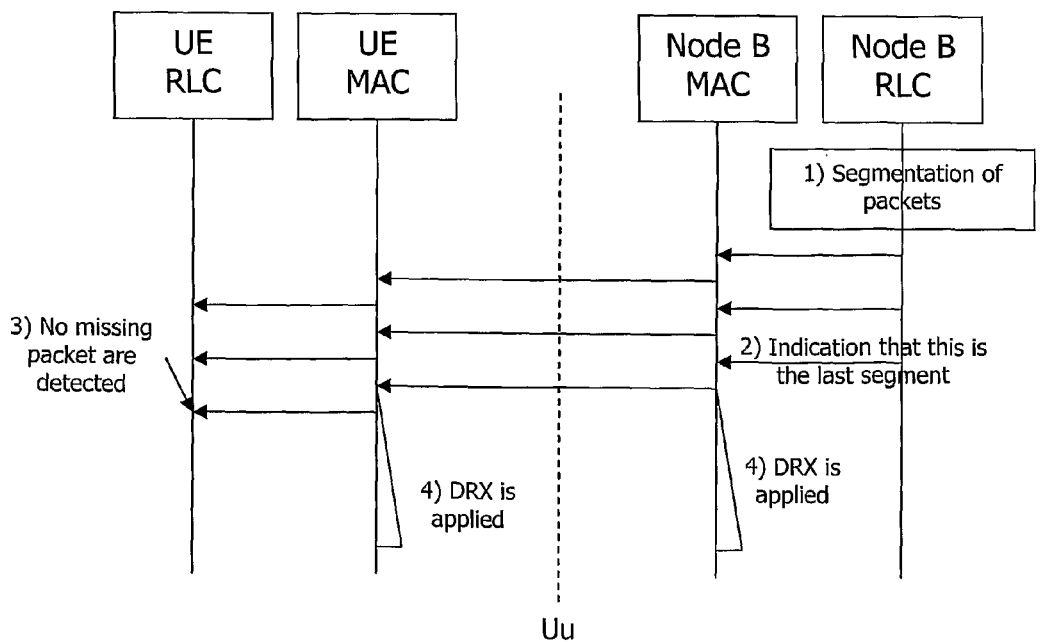
FIG. 20 illustrates a DRX period after reception in RLC in accordance with one embodiment of the present invention.

FIG. 20 illustrates a DRX period after reception in RLC in accordance with one embodiment of the present invention. In accordance with the present invention, a DRX period may be triggered when a complete SDU is received at the RLC. Referring to FIG. 20, a DRX period may be triggered when all SDUs for which segments have been received are complete. Preferably, the Node B MAC receives the segments from the RLC layer, together with an indication that a particular segment is a last segment, or that a certain MAC PDU contains all parts of all earlier SDUs (step 2). Thus, once all segments, prior to the segment containing all parts of earlier SDUs, are transmitted successfully, the Node B will refrain from scheduling a transmission during a certain period. Similarly, the UE, after receiving all segments of an SDU will perform DRX during a predefined period.

Figure 21:
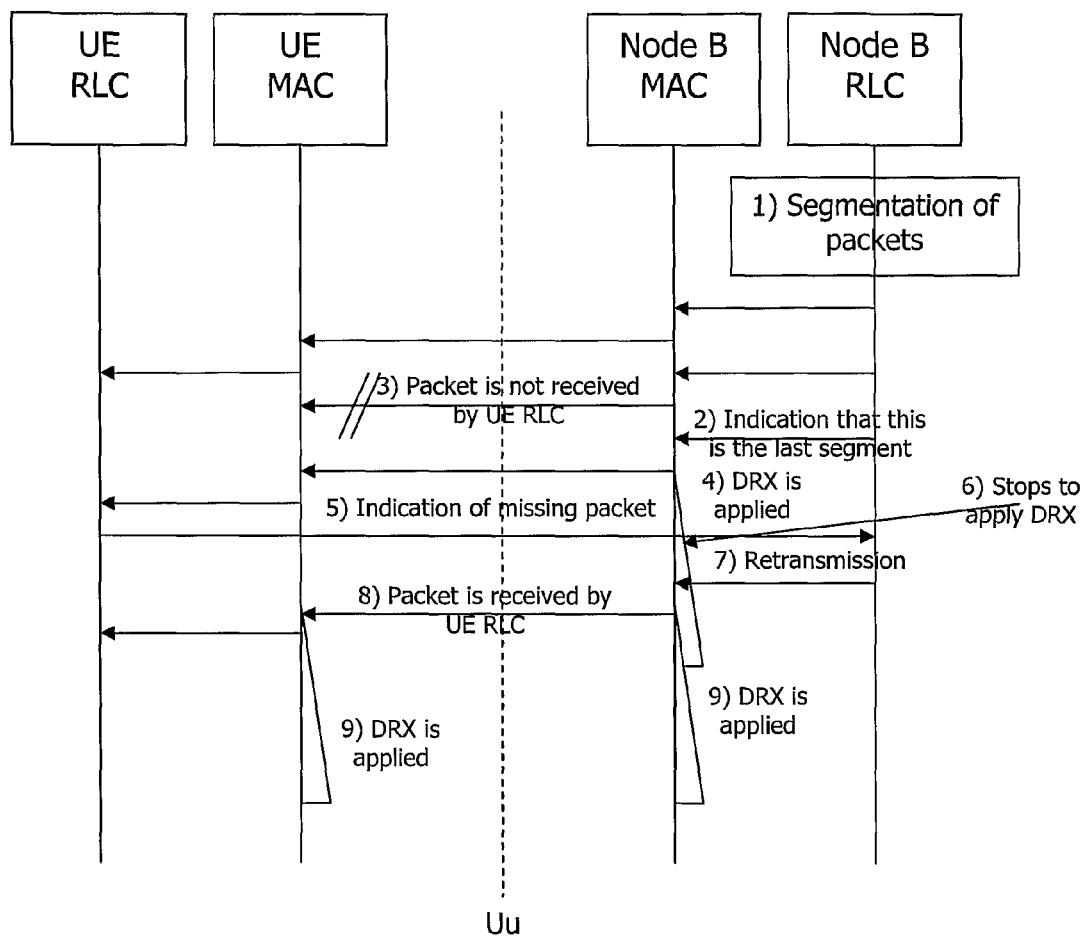
FIG. 21 illustrates a DRX period after reception in RLC in accordance with one embodiment of the present invention wherein a packet segment is unsuccessfully received.

FIG. 21 illustrates a DRX period after reception in RLC in accordance with one embodiment of the present invention wherein a packet segment is unsuccessfully received. Referring to FIG. 21, the Node B does not initially know whether a transmission of a packet was unsuccessful. Therefore, the Node B preferably does not schedule a data transmission to the UE for a predetermined amount of time (step 4). However, the UE can detect whether there is a packet missing, and indicate this information to the Node B (step 5). Accordingly, upon receiving an RLC indication that a packet is missing, the Node B may start retransmitting any missing packet. Upon transmitting the missing packet, the Node B will reapply the DRX period, i.e. refrain from scheduling a transmission during a predefined period. The UE, upon detecting that all SDUs for which segments have been received are complete, will apply the DRX period.

In accordance with the present invention, the DRX period or the time during which the Node B should refrain from scheduling a transmission may be standardized, indicated by system information, or by dedicated signaling. Furthermore the duration of a DRX period may not necessarily be the same after each reception of a packet. For example, the duration may depend on a size of the data received.

Figure 22:
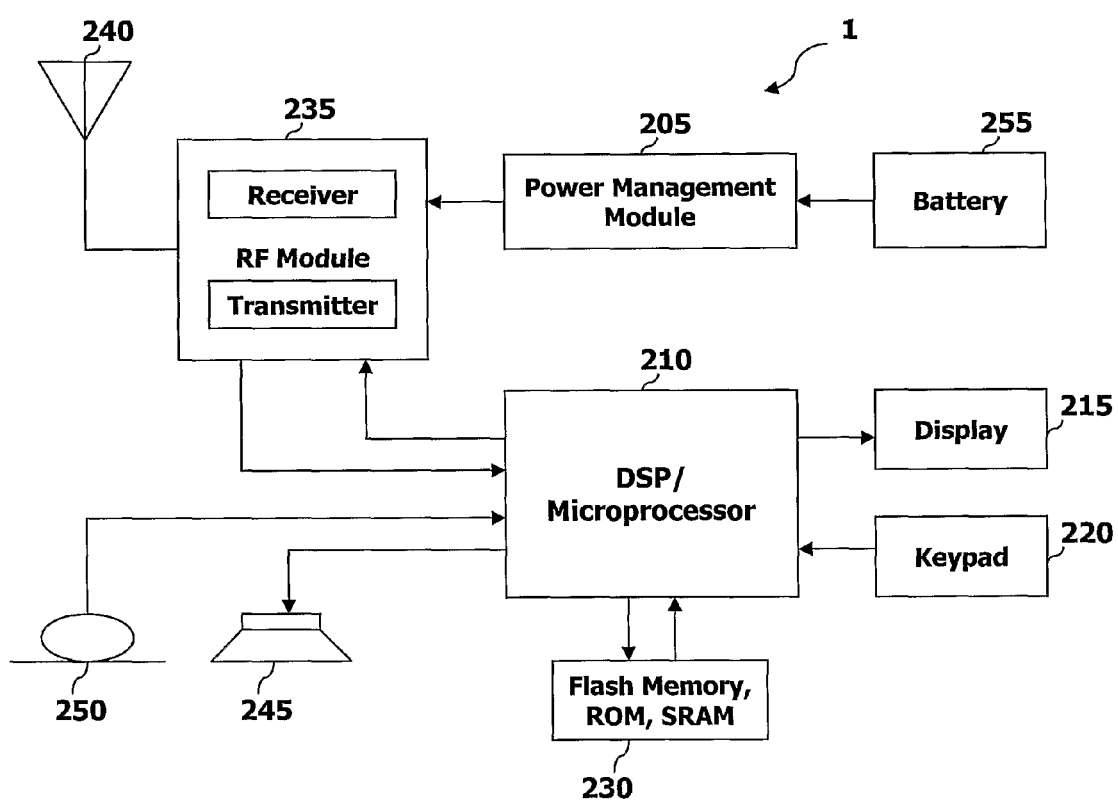
FIG. 22 illustrates a block diagram of a mobile station (MS) or UE in accordance with one embodiment of the present invention.

FIG. 22 illustrates a block diagram of a mobile station (MS) or UE 1 in accordance with the present invention. The UE 1 includes a processor (or digital signal processor) 210, RF module 235, power management module 205, antenna 240, battery 255, display 215, keypad 220, memory 230, speaker 245 and microphone 250.

A user enters instructional information, such as a telephone number, for example, by pushing the buttons of a keypad 220 or by voice activation using the microphone 250. The microprocessor 210 receives and processes the instructional information to perform the appropriate function, such as to dial the telephone number. Operational data may be retrieved from the memory module 230 to perform the function. Furthermore, the processor 210 may display the instructional and operational information on the display 215 for the user's reference and convenience.

The processor 210 issues instructional information to the RF module 235, to initiate communication, for example, transmits radio signals comprising voice communication data. The RF module 235 comprises a receiver and a transmitter to receive and transmit radio signals. An antenna 240 facilitates the transmission and reception of radio signals. Upon receiving radio signals, the RF module 235 may forward and convert the signals to baseband frequency for processing by the processor 210. The processed signals would be transformed into audible or readable information outputted via the speaker 245, for example. The processor 210 also includes the protocols and functions necessary to perform the various processes described herein.

It will be apparent to one skilled in the art that the mobile station 1 may be readily implemented using, for example, the processor 210 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for communicating between a network and a mobile terminal in a wireless communication system, the method comprising:
   receiving a coded data unit from the network;
   determining whether the coded data unit can be successfully decoded;
   determining not to receive a transmission from the network for a first predetermined amount of time independent of whether the coded data unit is successfully decoded;

determining not to receive a transmission from the network for a second predetermined amount of time when the coded data unit is successfully decoded;

receiving a first indicator indicating that all segments of a segmented data unit have been transmitted by the network;

determining whether all the segments of the segmented data unit are successfully received and successfully decoded;

transmitting a second indicator to the network indicating a missing segment if all the segments of the segmented data unit are not successfully received;

successfully receiving a retransmission of the missing segment; and not receiving a transmission from the network for the first predetermined amount of time when all the segments of the segmented data unit are successfully received and successfully decoded.

2. The method of claim 1, further comprising providing acknowledgment to the network if the coded data unit is successfully decoded.

3. A method for communicating between a network and a mobile terminal in a wireless communication system, the method comprising:

receiving a coded data unit from the network;

determining whether the coded data unit is a last data unit to be received when the coded data unit is successfully decoded;

determining not to receive a transmission from the network for a first predetermined amount of time if the coded data unit is the last data unit to be received;

receiving a first indicator indicating that all segments of a segmented data unit have been transmitted by the network;

determining whether all the segments of the segmented data unit are successfully received and successfully decoded;

transmitting a second indicator to the network indicating a missing segment if all the segments of the segmented data unit are not successfully received;

successfully receiving a retransmission of the missing segment; and not receiving a transmission from the network for a second predetermined amount of time when all the segments of the segmented data unit are successfully received and successfully decoded.

4. The method of claim 3, wherein a radio link control (RLC) header of the coded data unit indicates whether the coded data unit is the last data unit to be received.

5. The method of claim 3, wherein a medium access control (MAC) header of the coded data unit indicates whether the coded data unit is the last data unit to be received.

6. The method of claim 3, further comprising providing acknowledgment to the network when the coded data unit is successfully decoded.

7. A method for communicating between a network and a mobile terminal in a wireless communication system, the method comprising:

unsuccessfully receiving from the network a data packet to be received;

providing the network with an indication of the unsuccessful reception of the data packet;

determining not to receive a transmission from the network for a first predetermined amount of time independent of whether the data packet is successfully received;

successfully receiving a retransmission of the data packet;

transmitting an acknowledgment of the successful reception of the retransmitted data packet;

determining not to receive a transmission from the network for a second predetermined amount of time after transmitting the acknowledgment;

receiving a first indicator indicating that all segments of a segmented data unit have been transmitted by the network;

determining whether all the segments of the segmented data unit are successfully received and successfully decoded;

transmitting a second indicator to the network indicating a missing segment if all the segments of the segmented data unit are not successfully received;

successfully receiving a retransmission of the missing segment; and not receiving a transmission from the network for the first predetermined amount of time when all the segments of the segmented data unit are successfully received and successfully decoded.

8. A method for communicating between a network and a mobile terminal in a wireless communication system, the method comprising:

unsuccessfully receiving from the network a data packet to be received;

providing the network with an indication of the unsuccessful reception of the data packet;

waiting for a retransmission of the data packet to be received for a first predetermined amount of time;

determining not to receive a transmission from the network for a second predetermined amount of time after the first predetermined amount of time expires;

receiving a first indicator indicating that all segments of a segmented data unit have been transmitted by the network;

determining whether all the segments of the segmented data unit are successfully received and successfully decoded;

transmitting a second indicator to the network indicating a missing segment if all the segments of the segmented data unit are not successfully received;

successfully receiving a retransmission of the missing segment; and not receiving a transmission from the network for a third predetermined amount of time when all the segments of the segmented data unit are successfully received and successfully decoded.

9. A method for communicating between a network and a mobile terminal in a wireless communication system, the method comprising:

transmitting a coded data unit to the mobile terminal;

determining not to transmit to the mobile terminal for a first predetermined amount of time independent of whether the coded data unit is successfully decoded by the mobile terminal;

determining not to transmit to the mobile terminal for a second predetermined amount of time when the coded data unit is successfully decoded by the mobile terminal;

transmitting a first indicator indicating that all segments of a segmented data unit have been transmitted to the mobile terminal;

suspending transmission to the mobile terminal for the first predetermined amount of time when all the segments of the segmented data unit are transmitted to the mobile terminal;

receiving from the mobile terminal a second indicator indicating a missing segment if all the segments of the segmented data unit are not successfully received;

retransmitting the missing segment to the mobile terminal; and resuspending transmission to the mobile terminal for the first predetermined amount of time when the missing segment is retransmitted to the mobile terminal.

10. The method of claim 9, further comprising receiving an acknowledgment from the mobile terminal if the coded data unit is successfully decoded by the mobile terminal.

11. A method for communicating between a network and a mobile terminal in a wireless communication system, the method comprising:

transmitting a coded data unit to the mobile terminal, wherein the coded data unit is a last data unit to be transmitted to the mobile terminal;

suspending transmission to the mobile terminal for a first predetermined amount of time when the coded data unit is transmitted;

transmitting a first indicator indicating that all segments of a segmented data unit have been transmitted to the mobile terminal;

suspending transmission to the mobile terminal for a second predetermined amount of time when all the segments of the segmented data unit are transmitted to the mobile terminal;

receiving a second indicator from the mobile terminal indicating a missing segment if all the segments of the segmented data unit are not successfully received by the mobile terminal;

retransmitting the missing segment to the mobile terminal; and resuspending transmission to the mobile terminal for the second predetermined amount of time when the missing segment is retransmitted to the mobile terminal.

12. The method of claim 11, wherein a radio link control (RLC) header of the coded data unit indicates whether the coded data unit is the last data unit to be transmitted.

13. The method of claim 11, wherein a medium access control (MAC) header of the coded data unit indicates whether the coded data unit is the last data unit to be transmitted.

14. The method of claim 11, further comprising receiving an acknowledgment from the mobile terminal if the coded data unit is successfully decoded by the mobile terminal.

15. A method for communicating between a network and a mobile terminal in a wireless communication system, the method comprising:

transmitting a data packet to the mobile terminal;

receiving an indication indicating that the data packet was unsuccessfully received by the mobile terminal;

suspending transmission to the mobile terminal for a first predetermined amount of time independent of whether the data packet is successfully received;

retransmitting the data packet to the mobile terminal;

receiving from the mobile terminal an acknowledgment of the successful reception of the retransmitted data packet;

suspending transmission to the mobile terminal for a second predetermined amount of time after receiving the acknowledgment;

transmitting a first indicator indicating that all segments of a segmented data unit have been transmitted to the mobile terminal;

suspending transmission to the mobile terminal for the first predetermined amount of time when all the segments of the segmented data unit are transmitted to the mobile terminal;

receiving a second indicator from the mobile terminal indicating a missing segment if all the segments of the segmented data unit are not successfully received by the mobile terminal;

retransmitting the missing segment to the mobile terminal; and resuspending transmission to the mobile terminal for the first predetermined amount of time when the missing segment is retransmitted to the mobile terminal.

* * * * *